United States Patent [19]

Turner

[11] Patent Number: 4,463,630
[45] Date of Patent: Aug. 7, 1984

[54] CHAIN-SAW CHAIN SHARPENING DEVICE

[76] Inventor: John P. Turner, Houghton House, Ringmore, Kingsbridge, Devon, England

[21] Appl. No.: 341,648

[22] Filed: Jan. 22, 1982

[30] Foreign Application Priority Data

Feb. 6, 1981 [GB] United Kingdom ............ 8103784
Nov. 17, 1981 [GB] United Kingdom ............ 8134543

[51] Int. Cl.$^3$ .................................... B23D 63/16
[52] U.S. Cl. ............................. 76/25 A; 76/41
[58] Field of Search ................. 76/25 A, 37, 41

[56] References Cited

U.S. PATENT DOCUMENTS

| 3,020,783 | 2/1962 | Hill | 76/37 |
| 3,779,103 | 12/1973 | Silvey | 76/25 A |
| 4,319,502 | 3/1982 | Smith | 76/25 A |

FOREIGN PATENT DOCUMENTS

| 2260990 | 6/1973 | Fed. Rep. of Germany | 76/25 A |
| 2828496 | 1/1980 | Fed. Rep. of Germany | 76/25 A |
| 2952040 | 7/1981 | Fed. Rep. of Germany | 76/25 A |

Primary Examiner—Roscoe V. Parker
Attorney, Agent, or Firm—Thomas J. Greer, Jr.

[57] ABSTRACT

A saw-chain sharpening device is provided which is releasably attachable to a portable chain saw to enable routing-type saw chain cutters to be sharpened in situ on the chain-saw guide bar. The sharpening device comprises a support bridge clampable to the saw guide bar in a position straddling one pass of the chain. This bridge supports a grinding-wheel mounting arrangement which can be set up to orientate a grinding wheel carried thereby into the plane of the routing-edge face of a cutter to be sharpened. Once correctly orientated, the grinding wheel is driven in rotation by external means (such as a conventional electric drill) and approached towards the cutter along a path lying in said plane. This path is defined by a linear guide of the mounting arrangement, the guide being slanted at the undercut angle of the cutter face.

4 Claims, 9 Drawing Figures

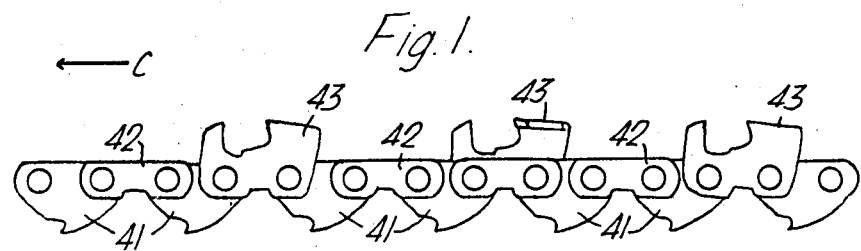
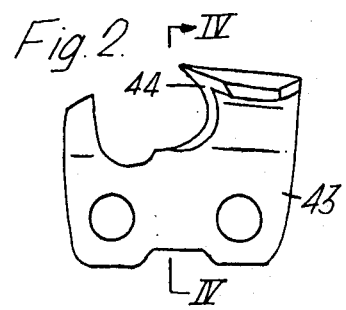
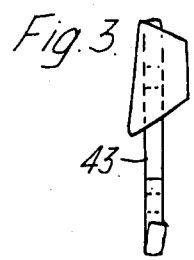
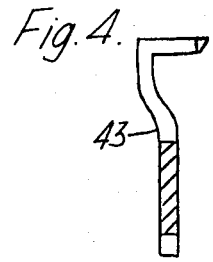
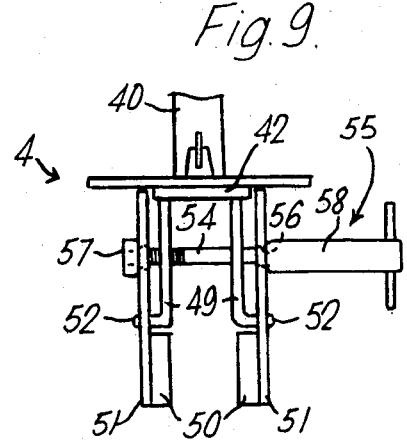

CHAIN-SAW CHAIN SHARPENING DEVICE

BACKGROUND OF THE INVENTION (a) Field of the Invention

The present invention relates to a chain-saw chain sharpening device which is releasably attachable to a portable chain saw to enable routing-type saw chain cutters to be sharpened in situ on the chain-saw guide bar.

(b) Description of the Prior Art

Saw chains with routing-type cutters are very widely used and are characterised by the provision on the leading edge of each cutter tooth of a routing-edge face which is both rearwardly inclined (raked) with respect to the direction of advance of the saw chain and undercut at a predetermined angle.

When in continuous use, the chain of a chain saw requires frequent sharpening to maintain maximum cutting efficiency. Ideally a chain would be re-sharpened two or three times during a working day. Since routing-type cutters cannot be sharpened by holding a grinding surface against the chain while the latter is circulated, the sharpening of router-type chain "in the field" has in the past had to be done by hand using a file. Hand sharpening of a chain is not only very time consuming but, unless expertly done, will result in a crooked cut due to non-uniformity in sharpening of the cutters.

U.S. Pat. No. 4,173,908 discloses a saw chain sharpening fixture for the in-situ sharpening of router-type saw chain cutters. This fixture is arranged to be clamped to the chain-saw guide bar and includes two guides which project laterally on respective sides of the guide bar at the rake angle of the cutters to be sharpened. Each guide is, in turn, used to support a sharpening tool, such as a small-diameter grinding cylinder, which is inserted into the gullet between the depth gauge and tooth of a cutter. In use, the grinding cylinder is powered by an electric drill and is drawn across the routing-edge face of each cutter.

While the sharpening fixture disclosed in U.S. Pat. No. 4,173,908 does expedite sharpening of a saw chain in the field, it also possesses a number of disadvantages, one of the most notable of which is that, owing to the necessarily small diameter of grinding cylinder, only relatively low grinding speeds are obtainable and this limits the quality of the reground faces of the cutters.

It is an object of the present invention to provide an improved chain-saw chain sharpening device.

SUMMARY OF THE INVENTION

According to the present invention there is provided a chain-saw chain sharpening device which is releasably attachable to a portable chain saw to enable routing-type saw chain cutters to be sharpened in situ on the chain saw guide bar, said device comprising a grinding wheel and a mounting arrangement therefor, said mounting arrangement including:

a support structure releasably attachable to the chain saw to support the grinding wheel over the chain-saw guide bar, orientation-setting means carried by the support structure and adjustable to orientate the grinding wheel into the plane of the routing-edge face of a cutter to be sharpened, and guide means, carried by the support structure, for guiding the grinding wheel, in its set orientation, along a path lying in said plane, movement of the grinding wheel in the appropriate direction along said path serving to move the wheel progressively into contact with the cutter to be sharpened, the mounting arrangement being such as to enable the grinding wheel to be driven in rotation simultaneously with its movement towards said cutter to be sharpened.

By using a grinding wheel orientated into the plane of the routing-edge face to be ground, it is possible to employ a grinding wheel of any desired diameter so that the grinding-wheel peripheral speed necessary for a good quality of reground face to be achieved is no longer a problem. The grinding wheel is, for example, arranged to be driven by a conventional electric drill or by a 12 v. d.c. motor.

In one preferred embodiment, the grinding wheel is rotatably carried on a mounting block of the mounting arrangement, said block being guided by said guide means for linear sliding movement towards and away from the chain saw guide bar in a direction parallel to the plane of the grinding wheel. The guide means which is constituted by a linear guide element, is slanted from the perpendicular to the local direction of advance of the saw chain by an angle equal to the undercut angle of the routing-edge faces of the cutters. Furthermore, the orientation-setting means comprises means pivotally mounting said guide means on the support structure for pivotal movement about an axis extending in the centre plane of the guide bar and perpendicular to the said direction of advance of the saw chain, pivoting of the guide means about said axis enabling the grinding wheel to be set to the rake angle of the cutter to be sharpened.

Advantageously, said support structure is in the form of a bridge arranged to straddle one pass of the saw chain and provided with clamping means which can be tightened into engagement with opposite faces of the guide bar to enable the device to be releasably clamped thereto. The bridge and its associated clamping means are preferably arranged to automatically centre said axis of pivoting of the guide means in the central plane of the guide bar, upon said clamping means being tightened up to secure the device in position on the chain-saw guide bar.

BRIEF DESCRIPTION OF THE DRAWINGS

Two forms of chain-saw chain sharpening device, each embodying the invention, will now be particularly described, by way of example, with reference to the accompanying diagrammatic drawings, in which:

FIG. 1 is a side elevation of a length of chain-saw chain;

FIG. 2 is an enlarged view of a cutter of the chain shown in FIG. 1;

FIG. 3 is a plan view of the cutter shown in FIG. 2;

FIG. 4 is a section on line IV—IV of FIG. 2;

FIG. 9 is a view in the direction of arrow Y of FIG. 7 showing the support bridge of the second form of chain-sharpening device.

DESCRIPTION OF THE PREFERRED EMBODIMENTS

Figure 5:
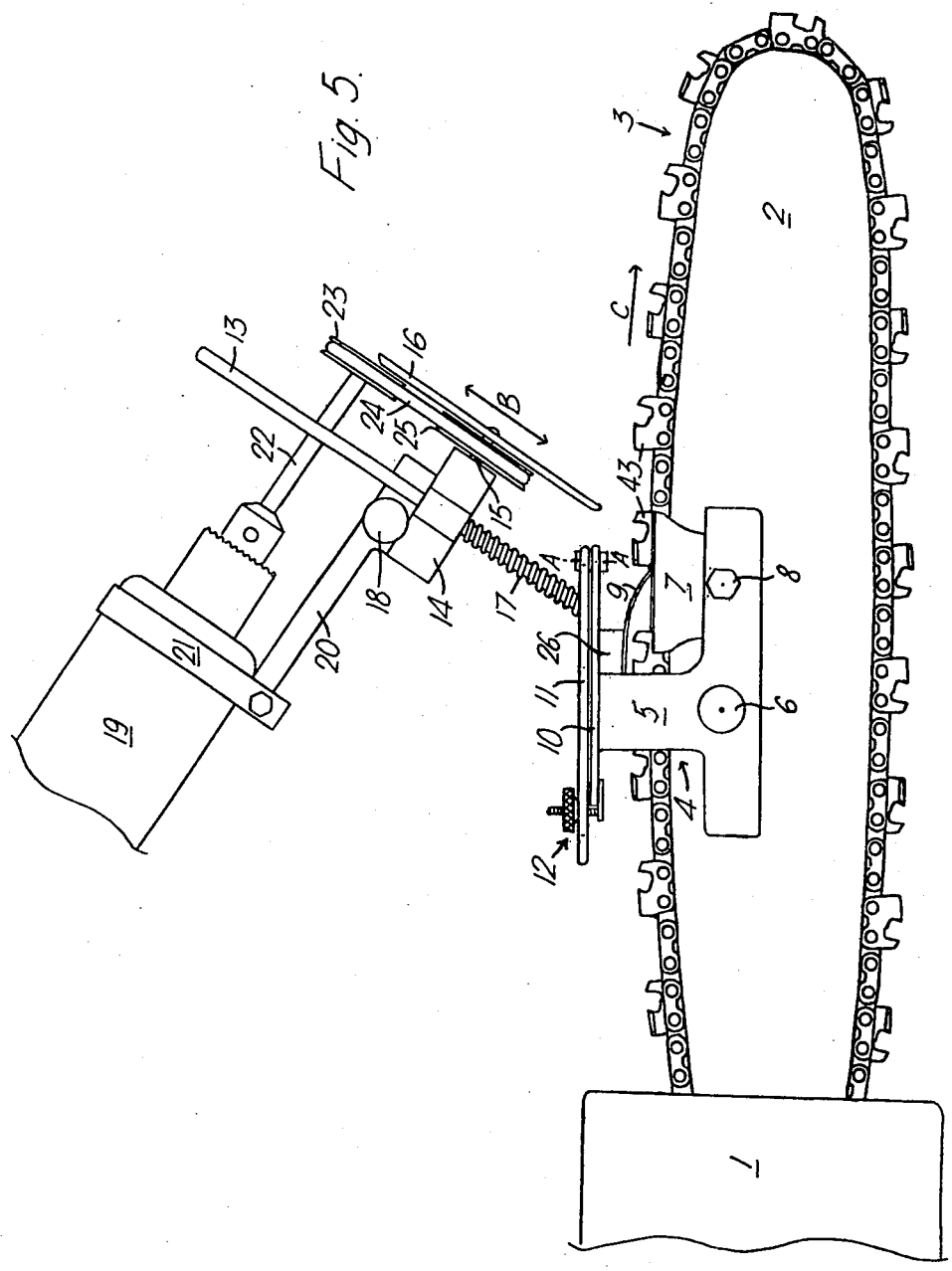
FIG. 5 is a side elevation of the first form of chain sharpening device, the device being shown attached to a chain saw and with a grinding wheel of the device in a central, non-working position.

A typical router-type chain-saw chain (FIG. 1 is composed of drive links 41 interconnected by pairs of tie straps 42 (only one strap of each pair being visible) with every fourth tie strap 42 on each side of the chain being replaced by a cutter 43. FIG. 1 shows two left-hand cutters 43 (that is, cutters situated on the left-hand side of the chain considered in the direction of cutting advance C) together with one right-hand cutter 43. The left and right hand cutters 43 alternate along the chain.

A right-hand cutter 43 is shown in greater detail in FIGS. 2 to 4. As best seen in FIG. 2, the cutter 43 is formed with a raked and undercut routing-edge face 44. It is this face 44 which requires to be re-ground when sharpening the cutter.

Shown in FIG. 5 is a chain saw comprising a power unit 1, a chain guide bar 2, and a chain 3. When operating, the power unit 1 serves to circulate the chain 3 around the periphery of the guide bar 2 in the direction of arrow C.

Also shown in FIG. 5 is the chain-sharpening device embodying the present invention, this device being illustrated already attached to the chain saw. The sharpening device comprises a main support bridge 4 which straddles the upper pass of the chain 3 and is provided with legs 5 which extend down on both sides of the guide bar 2. The legs 5 incorporate a screw clamping arrangement which by means of a knob 6 can be tightened up to clamp the bridge 4 firmly to the guide bar 2. At their lower ends the legs 5 also carry respective ones of a pair of chain-gripping jaws 7 which can be tightened and slackened by means of respective knobs 8 (only one of which is shown). When tightened up, the jaws 7 serve to hold the chain in a fixed position relative to the guide bar 2.

A spring pawl 9 projects from the underside of the bridge 4 to engage with the chain 3. This pawl 9 serves to define the position in which a cutter 43 about to be sharpened should be located, the free end of the pawl 9 engaging the back of the cutter 43 when the latter is positioned as required. In this manner, it is possible to ensure that all cutters are sharpened to equal lengths.

Figure 6:
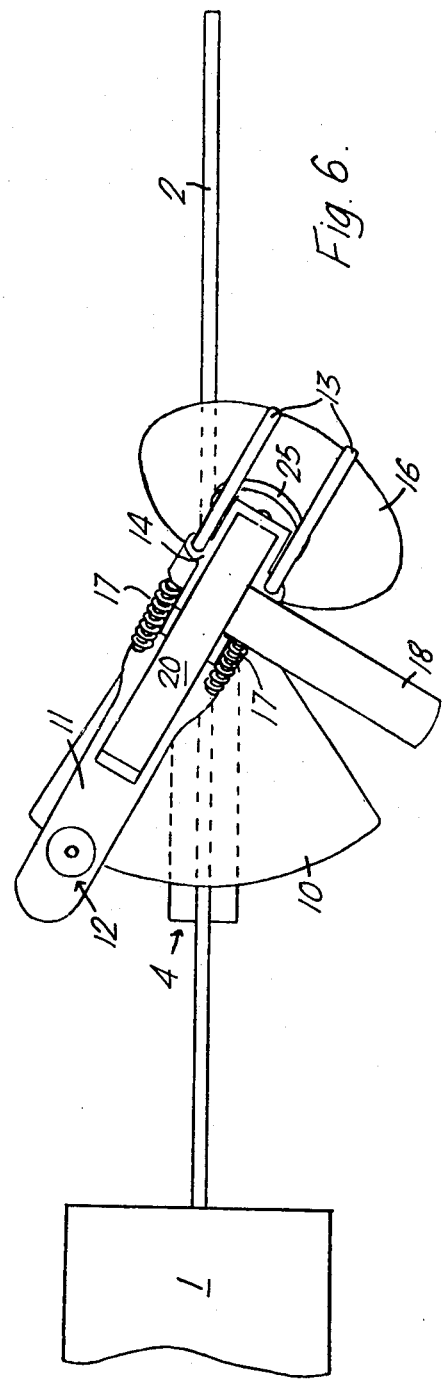
FIG. 6 is a plan view of the first form of the sharpening device attached to the chain saw, the chain-saw chain and parts of the device being omitted for clarity and the grinding wheel being shown angled for sharpening left-hand cutters of the chain.

The bridge 4 carries a sector-shaped support plate 10 (shown in plan in FIG. 6). An arm 11 is pivotally mounted on the support plate 4 for rotation about an axis A—A which lies in the plane of the chain 3 and extends substantially perpendicular to the upper pass of the chain. Adjacent its end remote from the pivot axis A—A, the arm 11 carries a screw clamp 12 which cooperates with the arcuate edge portion of the plate 10 to enable the arm 11 to be releasably secured at a desired angle relative to the direction of extent of the centre line of chain upper pass. As will become apparent hereinafter, the angling of the arm 11 determines, for each cutter 43 sharpened, the rake angle of its routing-edge face 44. The plate 10 may be marked to indicate the positions of the arm 11 at certain angles (for example 30° and 35°) on both sides of the chain centre line. In FIG. 5 the arm 10 is shown in a central position in which it extends parallel to the centre line of the chain upper pass; in FIG. 6, the arm 10 is angled at 30° to the chain centre line.

Adjacent the pivot axis A—A, the arm 11 carries two, spaced, parallel guide rods 13 which extend in the same direction as the arm 11 but at a predetermined angle of inclination relative to the axis A—A. As will become apparent hereinafter, this angle of inclination determines the angle of undercut at which the cutters 44 are sharpened.

A mounting block 14 is slidably mounted by the guide rods 13.

The mounting block 14 rotatably supports a shaft 15 which carries a grinding wheel 16, the plane of the wheel 16 being parallel to that containing the guide rods 13. Movement of the block 14 along the guide rods 13 enables the grinding wheel to be approached and withdrawn to and from a cutter 43 located in the predetermined sharpening position set by the pawl 9, this movement being indicated in FIG. 5 by the double-headed arrow B. It is clear that the angle of undercut of the cutter's routing-edge face 44 is determined by the inclination of the grinding wheel relative to the axis A—A, this inclination being set by the guide rods 13; furthermore, it can also be seen that the angle of sharpening of the cutter's routing-edge face relative to the chain centreline will be determined by the angle of the arm 11.

Springs 17 located about the guide rods 13 between the arm 11 and the mounting block 14 serve to resiliently bias the grinding wheel 16 away from the chain 3, this bias being overcome in operation of the sharpening device by the operator exerting a downwards force on the mounting block 14 via the handle 18.

The grinding wheel 16 is arranged to be rotatably driven by drive means which are carried on the mounting block 14 and move bodily therewith. The drive means include an electric motor which can conveniently take the form of a standard mains-powered electric drill 19 (FIG. 5), or a 12 v D.C. motor energisable from a vehicle battery. The motor (drill 19) is mounted on a bracket 20 rigid with the mounting block 14 by means of a clamping collar 21. The electric motor is arranged to rotatably drive a shaft 22 which carries a pulley 23. This pulley 23 is coupled by a drive belt 24 with a second pulley 25 fast for rotation with the shaft 15 carrying the grinding wheel 16. In FIG. 6, most of the components of the drive means have been omitted for the sake of clarity, only the pulley 25 being shown.

To use the sharpening device, the device is first clamped onto the guide bar 2 of the chain saw. A cutter 43 to be sharpened is then positioned as required using the pawl 9 and, optionally, the chain locked in position by tightening the chain-gripping jaws 7. Next, the arm 11 is positioned as required, the arm 11 being moved to different sides of the chain centreline for right and left-hand cutters 43 (in FIG. 6, the arm 11 is shown angled for a left-hand cutter 43). The size of angle between the chain centreline and the arm 11 is selectively set in correspondence to the rake angle of the cutters (typically values of 30° or 35° will be appropriate depending on chain type).

The electric drill is now switched on and sharpening is commenced by the operator pressing down on the handle 18 to progressively bring the grinding wheel into contact with the cutter 43 to be sharpened. After the cutter 43 has been sharpened, the next cutter requiring sharpening is moved into position by pulling round the chain by hand in the direction of arrow C, this being possible since the pawl 9 is resiliently raised by a cutter as it passes therebeneath. Once the cutter next to be sharpened has passed beneath the pawl 9, the chain is moved backwards until this cutter abuts the free end of the pawl. Sharpening of the chain continues in this manner with all the cutters of one hand being first sharpened before the arm 11 is readjusted for sharpening the cutters of the other hand.

In order to compensate for the fact that the cutting face 44 of a cutter 43 is located progressively further back on the cutter as it is repeatedly sharpened throughout its life, the sharpening position defined by the pawl 9 can be made adjustable. This can be achieved, for example, by mounting the pawl 9 on a block 26 carried by the bridge 4 in a manner enabling adjustment in position of the block.

Figure 7:
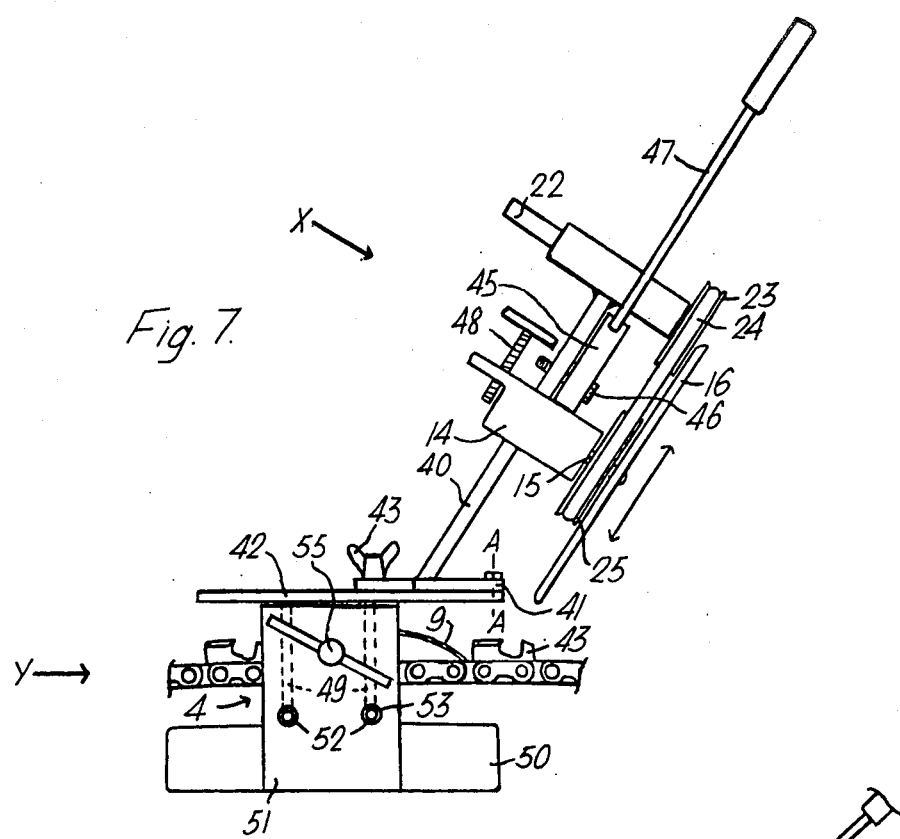
FIG. 7 is a side elevation similar to FIG. 5, but showing the second form of chain-sharpening device.
Figure 8:
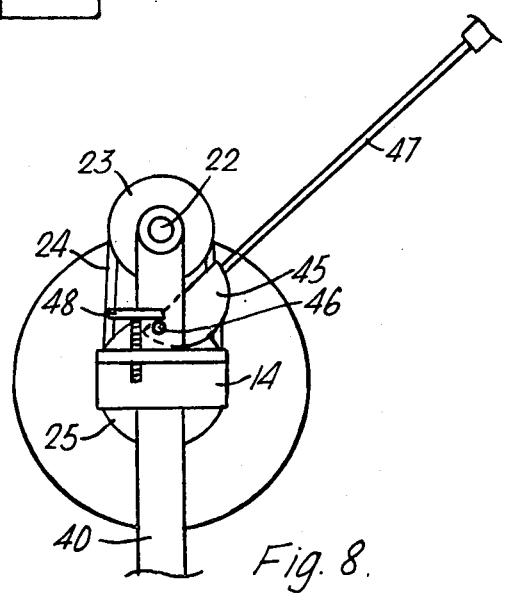
FIG. 8 is a view in the direction of arrow X of FIG. 7 showing the grinding-wheel drive and positioning arrangement of the modified chain-sharpening device.

The second form of chain-sharpening device, shown in FIGS. 7 to 9, comprises a main support bridge 4 for clamping the device to the guide bar 2 of a chain-saw in a position straddling a chain to be sharpened, a mounting block 14 rotatably mounting a shaft 15 carrying a grinding wheel 16, a single guide post 40 slidably carrying the mounting block 14, and drive means for rotatably driving the grinding wheel 16.

The guide post 40 is rigid with a sector plate 41 and is slanted from the perpendicular thereto at the undercut angle of the cutters to be sharpened. The post 40 is pivotally connected to a deck plate 42 of the support bridge 4 for pivotal movement about an axis A—A perpendicular to the plates 41, 42, and lying in the central plane of the guide bar carrying the chain to be sharpened. A clamping mechanism including a wing nut 43 serves to lock together the plates 41 and 42 in a desired mutual positioning whereby to set the grinding wheel 16 to the rake angle of a cutter to be sharpened.

The drive means for rotatably driving the grinding wheel 16 includes a pulley 25 fast for rotation with the shaft 15, a pulley 23 fast for rotation with an input shaft 22 which is rotatably mounted in a bearing rigid with the upper end of the post 40, and a resilient stretchable drive belt 24 passing around the pulleys 23 and 25. The shaft 22 is arranged to be driven in rotation by any suitable means.

A semi-circular cam 45 is mounted on a shaft 46 for eccentric movement about the shaft axis upon manual operation of a lever 47. The arcuate face of the cam 45 is arranged to press against the upper face of the block 14 such that the more the lever 47 is depressed, the further the block is pushed down the guide post 40 against the force of the resilient bias provided by the stretchable drive belt 24. In this manner, the grinding wheel 16 can be brought into engagement with a chain saw cutter to be sharpened, in a controlled manner. As soon as downward pressure is removed from the lever 47, the mounting block 14 will return upwards to its initial position under the bias provided by the resilient drive belt 24.

Downward movement of the block 14 is limited by means of an adjustable screw 48, the head of which is arranged to engage the projecting end of the shaft 46.

The support bridge 4 comprises, in addition to the deck plate 42, legs 49 depending from the plate 42, two wooden jaws 50, and two jaw-carrying plates 51 rigidly connected to respective ones of the jaws 50. The lower ends 52 of the legs 49 are bent outwardly and engage in apertures 53 formed in the carrying plates 51, these plates being free to slide along the outwardly bent leg ends 52. The threaded shank 54 of a key 55 extends through aligned apertures 56 in the plate 51 to engage in a captive nut 57. A body portion 58 of the key 55, is of wider diameter than the shank 54 and bears against the corresponding plate 51 around the aperture 56, the body being too wide to pass through the aperture. Upon the support bridge 4 being positioned astride a chain-saw guide bar and the key 55 being turned in the appropriate sense, the plates 51 and thus the jaws 50 are drawn together with the top ends of the plates 51 pressing against the deck plate 42 and the jaws 50 pressing against the chain-saw guide bar. By this arrangement the deck plate 42 (and thus the pivot axis A—A) becomes accurately centred over the guide bar which is necessary to ensure even sharpening of both right- and left-hand cutters.

Various modifications to the illustrated forms of chain-sharpening device are, of course, possible. Thus, for example, instead of arranging for the guides 13, 40 to pivot on the support bridge 4 about an axis A—A in order to set the grinding wheel to the cutter rake angle, the guides could be fixedly mounted on the bridge 4 with the mounting block 14 being arranged to pivot about an axis lying in the central plane of the saw guide bar; such an arrangement is not preferred since it is only possible to set up the wheel coplanar with the routing-edge face to be sharpened at one value of rake angle.

It is also possible to arrange for chain-sharpening device to be attached to the casing of a chain saw; however, this would generally require modification to the casing which is undesirable. For this reason, it is preferred to attach the device to the guide bar of a chain saw using the form of clampable support bridge illustrated.

I claim:
1. A chain-saw chain sharpening device which is releasably attachable to a portable chain saw to enable routing-type saw chain cutters to be sharpened in situ on the chain saw guide bar, said device comprising a grinding wheel and a mounting arrangement including:
   (a) a support structure releasably attachable to the chain-saw guide bar,
   (b) a pivotable member mounted on said support structure for pivotal movement about an axis extending in the plane of the guide bar and perpendicular to the local direction of advance of the saw chain along said bar,
   (c) a guide structure carried by said pivotable member and including at least one linear guide element which is convergent with said axis in a direction towards the saw chain and makes an angle with a notional plane extending along and perpendicular to the said guide bar corresponding to the desired angle of undercut of the routing edge faces of said cutters,
   (d) a mounting block linearly displaceable along said at least one linear guide element and rotatably mounting the said grinding wheel such that the angle between the plane of the wheel and said notional plane corresponds to the said desired angle of undercut routing edge faces of said cutters.

2. A device according to claim 1, wherein said guide structure comprises two, parallel, side-by-side linear guide elements between which the said mounting block is mounted.

3. A device according to claim 1, wherein said support structure is in the form of a bridge arranged to straddle one pass of the saw chain and provided with clamping means which can be tightened into engagement with opposite faces of the said guide bar to enable the device to be releasably clamped thereto, said bridge and its associated clamping means being arranged to automatically center said axis of pivoting the guide structure in the plane of the guide bar, upon tightening of said clamping means.

4. A device according to claim 1, further comprising:
(a) a first pulley coaxially fast for rotation with the said grinding wheel,
(b) an input drive shaft mounted in fixed position on the guide structure adjacent the end of said at least one guide element furtherest from the guide bar,
(c) a second pulley fast for rotation with said drive shaft, and
(d) a drive belt kinematically coupling the first and second pulleys whereby to transmit externally applied drive from the input drive shaft to the grinding wheel, the drive belt being of resilient form and serving to resiliently resist movement of said mounting block along said at least one linear guide element towards the chain-saw guide bar whereby said grinding wheel is normally held out of contact with a said cutter to be sharpened.

* * * * *